United States Patent [19]

Mizutani et al.

[11] Patent Number: 6,017,990

[45] Date of Patent: Jan. 25, 2000

[54] WHEEL COVER

[75] Inventors: Haruyasu Mizutani; Junji Koizumi, both of Aichi-ken, Japan

[73] Assignee: Toyoda Gosei Co., Ltd., Aichi-ken, Japan

[21] Appl. No.: 08/825,171

[22] Filed: Mar. 28, 1997

[30] Foreign Application Priority Data

Mar. 28, 1996 [JP] Japan .................................. 8-103607

[51] Int. Cl.⁷ .................................................. C08K 3/34
[52] U.S. Cl. ........................................................ 524/442
[58] Field of Search ............................................ 524/442

[56] References Cited

U.S. PATENT DOCUMENTS

| 5,576,374 | 11/1996 | Betso et al. | 524/451 |
| 5,623,013 | 4/1997 | Tanaka et al. | 524/443 |

FOREIGN PATENT DOCUMENTS

| 60-47043 | 3/1985 | Japan . |
| 61-197650 | 9/1986 | Japan . |
| 62-235350 | 10/1987 | Japan . |
| 2-296856 | 12/1990 | Japan . |
| 6-80839 | 3/1994 | Japan . |

*Primary Examiner*—Edward J. Cain
*Attorney, Agent, or Firm*—Cushman Darby & Cushman, IP Group of Pillsbury Madison & Sutro LLP

[57] ABSTRACT

The wheel cover for attaching automobile wheels is made of polypropylene containing 20~67 wt. %, thermoplastic elastomer containing 3~30 wt. % and acicular calcium silicate containing of 30~50 wt. %. The acicular calcium silicate is preferred with a filler orientation index that is less than 1000 and has average particle sizes between 1 and 100 μm. The polypropylene resin is high crystallization block polypropylene resin which contains 3~12 wt. % of ethylene ingredient. Heat deformed temperature (455 kPa) is more than 125 centigrade degree. It is preferred that the Melt flow index is more than 300 g/10 min.

7 Claims, 4 Drawing Sheets

50 μm (×500倍)

50 μm  (×500倍)

WHEEL COVER

The following priority application, Japanese Patent Application No. hei 8-103607, filed in Japan on Mar. 28, 1996, is hereby incorporated by reference into the present specification.

BACKGROUND OF THE INVENTION

1. Field of the Invention

This invention relates to a wheel cover for automobiles, and more particularly to a wheel cover having good mechanical properties and an excellent surface appearance.

2. Description of Related Art

Automobile wheels are frequently covered with wheel covers. The purpose, among others, of such wheel covers is to protect the bolts and to provide a pleasing surface design.

Wheel covers can be made of polypropylene resin containing fillers and/or reinforcing material or agents. A polypropylene resin composition, for example, can contain a surface treated inorganic filler as shown in Japanese laid open patent No. Sho 60-47043. A propylene ethylene block copolymer composition can contain an inorganic filler which is treated with silane as shown in Japanese laid open patent No. Sho 61-197650. A crystalline propylene ethylene block copolymer composition can contain an inorganic filler prepared by pulverizing with a surface treating agent as shown in Japanese laid open patent No. Sho 62-235350. Another composition is ethylene propylene butene-1 copolymer rubber as shown in Japanese laid open patent No. Hei 2-296856. Also, ethylene propylene block copolymer composition can contain an inorganic filler and elastomer as shown in Japanese laid open patent No. Hei 5-98122. Further, a wheel cover can be molded of a propylene resin composition including glass fiber as shown in Japanese laid open patent No. Hei 6-80839.

These compositions exhibit improved thermal resistance and impact resistance due to the added filler or reinforcing agents.

However, even if these compositions are used in molding wheel covers, protrusions or raised marks can occur where the molding material, flowing from two different directions in the mold, meet and become joined together.

This type of flow of molding is shown in FIG. 4A. The wheel cover being made is formed by injecting a molding resin 95 into a cavity 72 of a mold 71 with flow from two different directions merging together, as shown. Frequently such cavities 72 have complicated shapes to mold the wheel cover as shown in FIG. 5. Therefore, movement of the stream 90 of resin 95 within the cavity 72 can be complicated resulting in a series of such junctions of counter flowing streams of resin.

As shown in FIG. 4B, a welded part or joint related protrusion 93 can occur at the place or joint where the counter flowing resin streams 90 meet and flow together. Several such joints 93 are shown in FIG. 5.

Numeral 94 in FIG. 5 designates the location of an injection gate for the wheel cover.

As is also shown in FIG. 4B, it is thought that the protrusions occur due to a shrinkage difference between the joint portion 91, where the glass fiber filler is orientated across the joint, or in a thickness direction, relative to adjacent joint areas 92 where the glass fibers are more orientated in the stream or flow direction.

The joint protrusion 93 that is formed is especially high when using reinforced polypropylene with glass fiber 82. Because of its height, the surface appearance of wheel cover is not desirable. When a conventional polypropylene compound is used, the protrusion height ΔH is between 20 and 60 μm.

As shown in FIG. 5, it is desirable to mold an improved design for wheel covers with various types of shapes which can include complicated structures or shapes including small or large holes 96. The surface appearance of the welded portion is remarkable.

Also, the possibility of using an isotropic filler was considered but, while the protrusion height is reduced, the mechanical characteristics of the compound are decreased.

SUMMARY OF THE INVENTION

An object of this present invention is to provide a wheel cover, having low height protrusions at joint portions and an improved surface appearance. It is also an object to provide a wheel cover having good mechanical characteristics.

A wheel cover according to the present invention is formed from a compound which includes polypropylene of 20~67 wt. %, thermoplastic elastomer of 3~30 wt. % and acicular calcium silicate, having a needle-like structure, of 30~50 wt. %.

The protrusion height of joints is decreased by reason of the use of acicular calcium silicate. Furthermore, the surface appearance and the mechanical characteristics are improved by using the above-mentioned mixed compound. Also, such wheel covers can be manufactured at lower cost because of using low cost polypropylene as the base resin.

Furthermore, it is preferred to use acicular calcium silicate with a filler orientation index less than 1000. The filler orientation index means or equals the value for the aspect ratio of the acicular calcium silicate raised to a power equal to the weight ratio of the acicular calcium silicate as follows:

(Filler Orientation Index)=(aspect ratio of calcium silicate) (weight of calcium silicate)

The aspect ratio means the ratio of the average width of the acicular calcium silicate particles against the average length thereof.

When the filler orientation index is less than 1000, the protrusion height can be decreased. On the other hand, when the filler orientation index is more than 1000, it is difficult to effectively control protrusion height.

Furthermore, the average particle size "(d50)" of the acicular calcium silicate is preferred to be between 1 and 100 μm. The average particle size (d50) equals 50% of the integrated weight within the weight distribution of particle sizes measured using either the microtruck method, the laser method or the serigraph method.

When the average particle size of the acicular calcium silicate is less than 1 μm, the protrusion height may be increased. On the other hand, when the average particle size is more than 100 μm, the impact strength and the bending resilience may be decreased.

Preferably, the average particle size of the acicular calcium silicate is between 5 and 60 μm. Using such a size range allows the protrusion height to be decreased and the impact strength and bending resilience are each improved.

Furthermore, the polypropylene resin compound preferably includes an ethylene component in an amount between 3 and 12 wt. %. And also, it is preferred to use a high crystalline block copolymer polypropylene resin which has more than 125° C. of the heat deformed temperature at 455 kPa. The heat resistance, stiffness and impact resistance of the wheel cover are improved. The heat deformed temperature of 125° C. at 455 kPa shows the temperature which the composition is bent 0.25 mm with a pushing pressure of 455 kPa.

When the ethylene component is less than 3 wt. %, the impact resistance may be decreased. When the ethylene component is more than 12 wt. %, the heat resistance and the stiffness may be decreased.

The high crystalline polypropylene resin gas improved crystallinity and high stereo regularity of polypropylene molecules. Thus, the stiffness and heat resistance are improved.

Furthermore, the polypropylene resin preferably includes a denatured polypropylene resin of between 2 and 20 wt. %. The denatured polypropylene resin is the crystalline propylene copolymer which is denatured with an unsaturated organic acid, for example, acrylic acid, maleic acid, itaconic acid, maleic anhydride or derivatives thereof or mixtures thereof. Thus, there is a very desirable balance between the improved impact resistance, improved stiffness and improved strength of the molded products.

Furthermore, the above polypropylene resins are compatible with thermoplastic elastomers preferably chosen from one or more kinds of ethylene-α-olefin rubber groups, for example, ethylene-propylene block copolymer (EPM), ethylene-butene block copolymer (EBM), ethylene-heptene block copolymer (EHM) and ethylene-octene block copolymer (EOM).

Also, the thermal plastic elastomer is preferably chosen in one or more kinds of polystyrene thermoplastic elastomers and hydrogenated polystyrene thermoplastic elastomers. For example, the polystyrene thermal plastic elastomer is polystyrene-polybutadiene-polystyrne thermoplastic elastomer (SBS) and polystyrene-polyisoprene-polystyrene thermoplastic elastomer (SIS). Hydrogenated polystyrene thermoplastic elastomer group is polystyrene-poly(ethylene-butylene)-polystyrene (SEBS) and polystyrene-poly(ethylene-propylene)-polystyrene (SEPS). Thus, the above mechanical characteristics are also in good balance or a the thermoplastic elastomer is very compatible with the polypropylene resin.

BRIEF DESCRIPTION OF THE DRAWINGS

FIG. 4A is a diagrammatic side elevational view of a mold and resin flow; and

DESCRIPTION OF THE PREFERRED EMBODIMENTS

First Embodiment

Figure 1:
FIG. 1 shows the particulate structure of acicular calcium silicate by micrograph.
Figure 2:
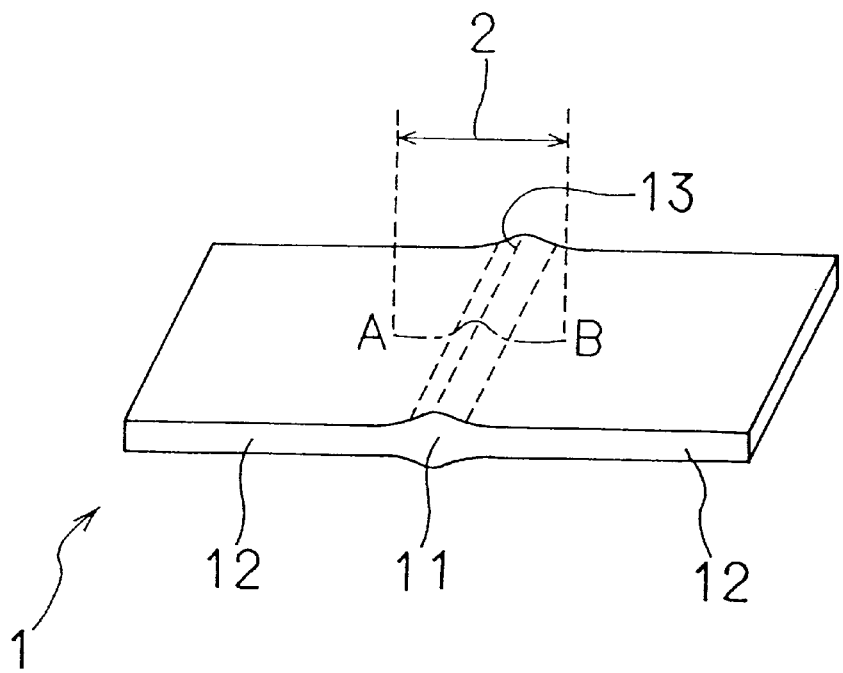
FIG. 2 is a perspective view of a joint portion protrusion.
Figure 3:
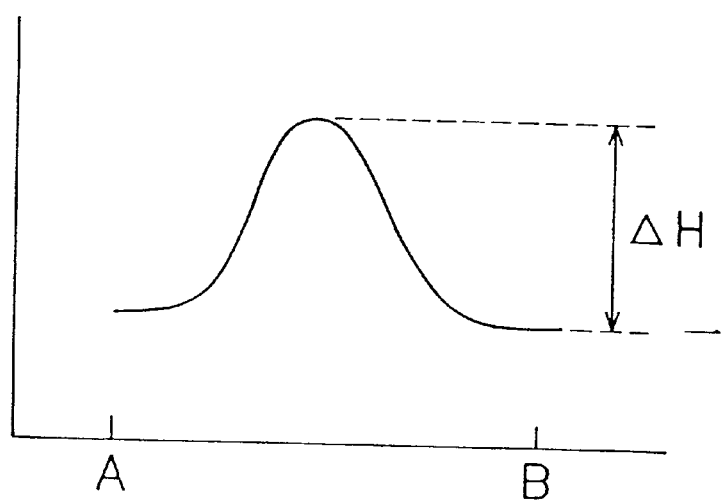
FIG. 3 graphically shows the height of the joint portion protrusion.
Figures 4, 4B:
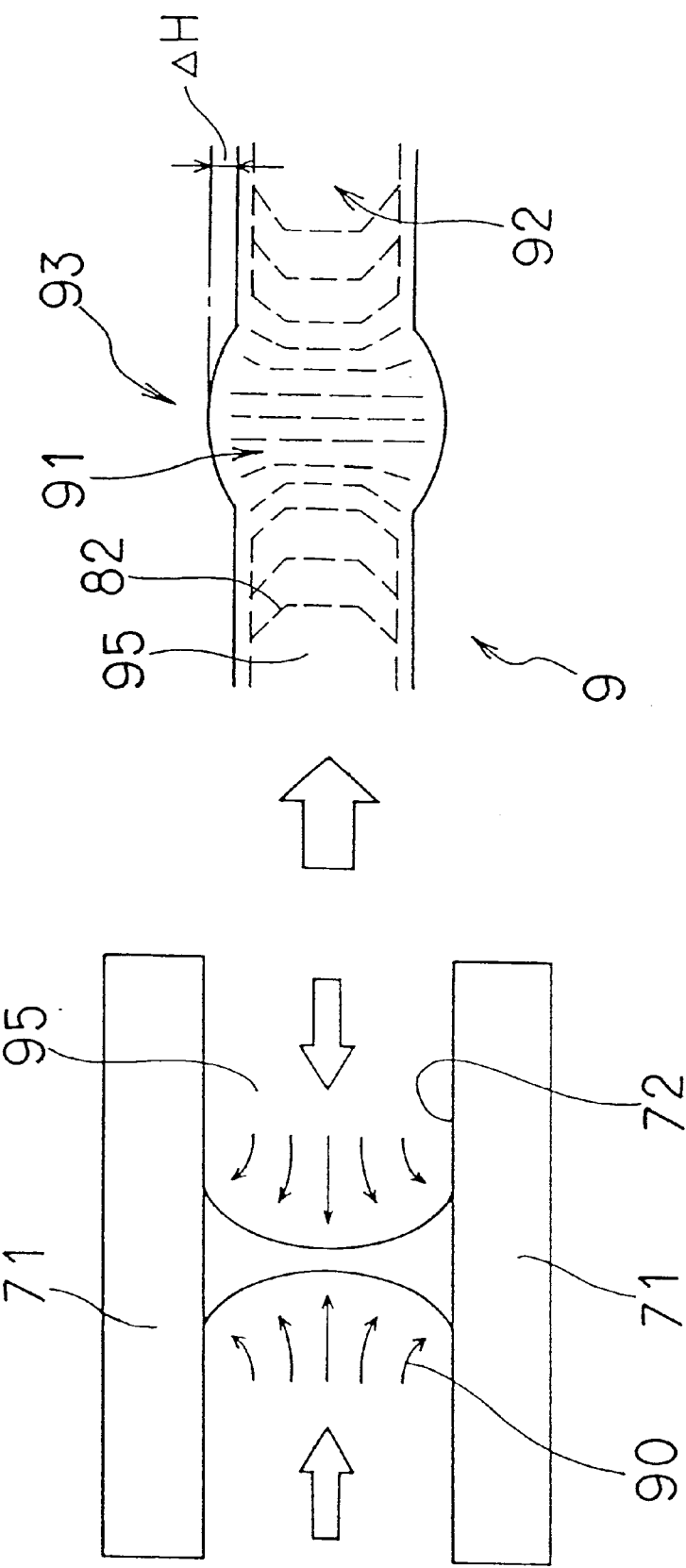
FIG. 4B is a diagrammatic cross-sectional view of a joint showing the size of the protruding surface and reinforcing fiber orientation.
Figure 5:
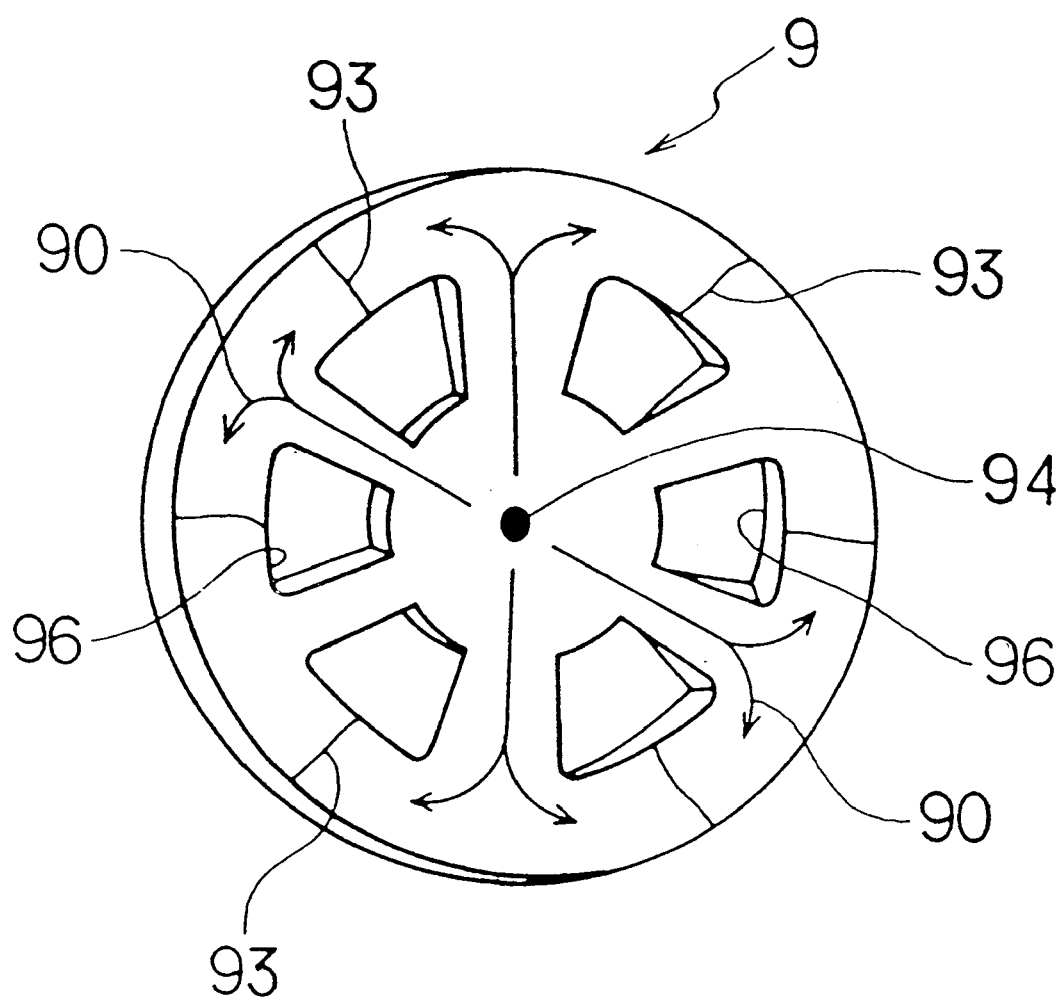
FIG. 5 is a perspective view of a molded wheel cover.

A first embodiment of this invention is explained in FIG. 1 to 3 and Table 1.

Table 1 includes a series of examples or test pieces exemplary of the final version of wheel covers.

TABLE 1

| | | (wt. %) | | | | | | | | |
|---|---|---|---|---|---|---|---|---|---|---|
| | Samples | E1 | E2 | E3 | E4 | C1 | C2 | C3 | E5 |
| A component | High crystallization PP (C2 10%, MI = 40) | 60 | 60 | 60 | 60 | 60 | 60 | 60 | |
| | High crystallization PP (C2 10%, MI = 10) | | | | | | | | 60 |
| | General purpose PP (C2 10%, MI = 40) | | | | | | | | |
| B component | Calcium silicate (L = 10, AR = 20) | 30 | | | | | | | |
| | Calcium silicate (L = 50, AR = 20) | | 30 | | | | | | |
| | Calcium silicate (L = 70, AR = 20) | | | 30 | | | | | |
| | Calcium silicate (L = 10, AR = 2) | | | | 30 | | | | |
| | Glass fiber (L = 200, AR = 50) | | | | | 30 | | | |
| | Talc (plate shape) | | | | | | 30 | | |
| | Calcium carbonate whisker (L = 10, AR = 40) | | | | | | | 30 | |
| | Filler orientation index | 600 | 600 | 600 | 60 | 1500 | | 1200 | 600 |
| C component | EPM | 10 | 10 | 10 | 10 | 10 | 10 | 10 | 10 |
| | SEBS | | | | | | | | |
| Measurment Item | Welded surface appearance | ◯ | ◯ | ◯ | ⊙ | X X | X | ⊙ | ◯ |
| | Protrusion height ΔH | 7.0 | 5.2 | 4.7 | 2.8 | 42.0 | 14.0 | 3.5 | 8.0 |
| | Bending resilience (MPa) | 2210 | 1920 | 1880 | 1800 | 4660 | 2910 | 1840 | 2150 |
| | Heat deforming temperature | 132 | 128 | 127 | 125 | 155 | 137 | 128 | 130 |
| | Izot impact strength (J/m) | 100 | 93 | 85 | 106 | 270 | 73 | 97 | 143 |
| | Judgement | ◯ | ◯ | ◯ | ◯ | X | X | ◯ | ◯ |

| | Samples | E6 | E7 | E8 | C4 | C5 |
|---|---|---|---|---|---|---|
| A component | High crystallization PP (C2 10%, MI = 40) | | 60 | 45 | 30 | 70 |
| | High crystallization PP (C2 10%, MI = 10) | | | | | |
| | General purpose PP (C2 10%, MI = 40) | 60 | | | | |
| B component | Calcium silicate (L = 10, AR = 20) | | 30 | 45 | 60 | 30 |
| | Calcium silicate (L = 50, AR = 20) | | | | | |
| | Calcium silicate (L = 70, AR = 20) | | | | | |
| | Calcium silicate (L = 10, AR = 2) | | | | | |
| | Glass fiber (L = 200, AR = 50) | | | | | |
| | Talc (plate shape) | | | | | |
| | Calcium carbonate whisker (L = 10, AR = 40) | | | | | |
| | Filler orientation index | 600 | 600 | 900 | 1200 | 600 |

TABLE 1-continued

| C component | EPM | 10 | | 10 | 10 | 10 | |
|---|---|---|---|---|---|---|---|
| | SEBS | | 10 | | | | Standard value |
| Measurment Item | Welded surface appearance | ○ | ○ | ○ | X | ○ | ○ or ⊚ |
| | Protrusion height ΔH | 7.3 | 6.3 | 9.6 | 13.6 | 6.5 | <10 |
| | Bending resilience (MPa) | 1770 | 2080 | 4800 | 7000 | 3010 | >1700 |
| | Heat deforming temperature | 124 | 132 | 145 | 155 | 140 | >120 |
| | Izot impact strength (J/m) | 110 | 135 | 98 | 96 | 73 | >80 |
| | Judgement | ○ | ○ | ○ | X | X | |

Pieces E1 to E8 in table 1 are injection molded using a composition which comprises polypropylene resin of 20 to 67 wt. %, thermal plastic elastomer of 3 to 30 wt. % and acicular calcium silicate of 30~50 wt. %.

With reference to Table 1, the "A" component demonstrates use of three different polypropylene resins that each contain of ethylene (C2) but with a different melt flow index (MI). Thermoplastic elastomer is used in the "C" component, for example, ethylene-propylene block copolymer (EPM) or polystyrene-poly(ethylene-butylene)-polystyrene block copolymer (SEBS). Four different acicular calcium silicates are used with the average particle and aspect ratio thereof being different.

One example of acicular calcium silicate is shown in FIG. 1. The rectangular shape semitranslucent solid in FIG. 1 is the acicular calcium silicate with an average particle size of 10 micro meter and an aspect ratio of 2.

Samples C1 to C4 were prepared for comparison with samples E1 to E8. Samples C1 to C3 used glass fiber, talc and calcium carbonate whisker, respectively, instead of the acicular calcium silicate. Sample C4 includes a richer amount of acicular calcium silicate than is used in pieces E1 to E8. The sample C5 does not include any thermoplastic elastomer.

The filler orientation indexes of these test pieces are calculated. The filler orientation index means the value shown above as being equal to the aspect ratio of the acicular calcium silicate, glass fiber, talc or calcium carbonate whisker raised to a power of the weight ratio of the added material for the particular filler.

According to these test pieces, an appearance quality and a protrusion height of the welded or joined areas of the merging resin flows within the mold, flexural modulus of elasticity, heated deformed temperature and Izot impact strength are measured as follows.

1. An appearance quality of welded surface portion

When the protrusion height of the joint surface portion is between 0 and 5 μm, the appearance quality is better. When the height is between 5 and 10 μm, a quality is good. However, when the height is between 10 and 20 μm, appearance quality is bad and a height over 20 μm is worse.

2. A protrusion height of the joint surface portion

As shown in FIG. 2, the protrusion height varies as one moves from the point A position, in the general portion 12 of molding 1, to a point B position located beyond the joint 11 in another general portion 12. The protrusion 13 is measured with a rough surface meter. As shown in FIG. 3, the difference in height of the protrusion is shown at ΔH. An example of such a rough surface meter is a Surfcom 550, manufactured by Tokyo Seimitsu Co., Ltd.

3. Flexural modulus of elasticity or the bending resilience (MPa) is measured by standard testing procedures as specified in ASTM-D790.

4. Heat deformed temperature is measured by standard testing procedures as specified in ASTM-D648 at 455 kPa pressure.

5. Izot impact strength is measured by the test procedures in ASTM-D256 at 23° C. with notch.

The contents percentage of moldings and the results of the measurement is shown in Table 1. The Table 1 is shown a standard number of capabilities for automobile wheel cover and is shown the result that is made of it basis on the standard. A circle designated the cover passed and a cross designates a cover has not passed.

The results of these measurements is shown in Table 1. The protrusion height of each samples E1~E8, after adding acicular calcium silicate containing of 30~45 wt. %, are low. Flexural modulus of elasticity, heated deformed temperature and izod impact strengths are each high and exhibit balanced results.

On the other hand, the protrusion height of each of the samples C1~C3, produced without acicular calcium silicate, are undesirably high. The protrusion height of sample C4, adding acicular calcium silicate containing of 60 wt. %, is also high. Sample C5 exhibits low Izod impact strength. Samples C1~C5 demonstrate bad balance among flexural modulus of elasticity, heated deformed temperature and Izod impact strength characteristics. As a consequence of such a poor balance between such characteristics, wheel covers may come off in use or be broken.

Second Embodiment

A series of second examples comprise injection molded wheel covers formed by using compositions E1, E4, C1 and C3 as referenced in Table 1. These wheel covers were measured or checked for surface appearance of the joint portion, the capability of each cover to be mounted or to break and become detached, heat resistance and impact strength characteristics as follows.

6. The appearance quality of the joint surface portion

This is measured in the same way as in the first example.

7. Mounting and detaching capability

Observations were made as to whether any of the wheel covers broke or cracked, when each wheel cover was put on and/or taken off a wheel. When no breaking or cracking occurred, it was judged better as shown by O. When a wheel cover exhibited breaking or cracking it is judged bad as shown by X.

8. Heat deformed resistance

Wheel covers were mounted on a carrier or disk, and heated for one hour at 150° C. After heating, deformation was observed. When a wheel cover was not remarkably deformed, it was judged better as shown by O. When it was remarkably deformed, it was judged bad as shown by X..

9. Impact strength

A wheel cover was dropped on a concrete surface in an environment held at −30° C., it was observed whether the cover broke. When a wheel cover did not break, it was judged better as shown by O. When a wheel cover was broken, it was judged bad as shown by X.

The above mentioned measurement results are shown in table 2.

| Sample | E1 | E4 | C1 | C3 |
|---|---|---|---|---|
| Appearance quality of welded surface portion | ○ | ⊙ | XX | ⊙ |
| Capability of desorb | ○ | ○ | ○ | ○ |
| Heat deformed resistance | ○ | ○ | ○ | ○ |
| Impact strength | ○ | ○ | ○ | X |

Wheel covers made of compounds E1 and E4 demonstrate good results of every measurement of the above characteristics. On the other hand, wheel cover made of compound C1 exhibited an appearance quality that was judged to be bad. Wheel covers made of compound C3 were poor at mounting and detaching and exhibited poor impact strength.

Thus, wheel covers made according to this invention exhibit low protrusion heights and a good appearance quality. Furthermore, such wheel covers demonstrate a good balance between mechanical properties of impact strength, bending resilience and heat deformed resistance.

What is claimed is:

1. A wheel cover mountable on a wheel of a motor vehicle, said wheel cover comprising:

20–67 wt. % of a polypropylene resin;
   3–30 wt % of a thermoplastic elastomer; and
   30–50 wt. % of an acicular calcium silicate having an average particle size between 10–70 μm.

2. The wheel cover according to claim 1, wherein said acicular calcium silicate has a filler orientation index less than 1000.

3. The wheel cover according to claim 1, wherein said polypropylene resin comprises 3 to 12 wt. % of an ethylene component.

4. The wheel cover according to claim 3, wherein said polypropylene resin is a high crystalline block copolymer polypropylene resin.

5. The wheel cover according to claim 1, wherein said thermoplastic elastomer is an ethylene-α-olefin rubber.

6. The wheel cover according to claim 1, wherein said thermoplastic elastomer is a polystyrene elastomer.

7. The wheel cover according to claim 1, wherein said thermoplastic elastomer is a hydrogenated polystyrene elastomer.

* * * * *